Feb. 23, 1971     G. L. CONGDON     3,564,713
HEDGE TRIMMER
Filed April 23, 1969
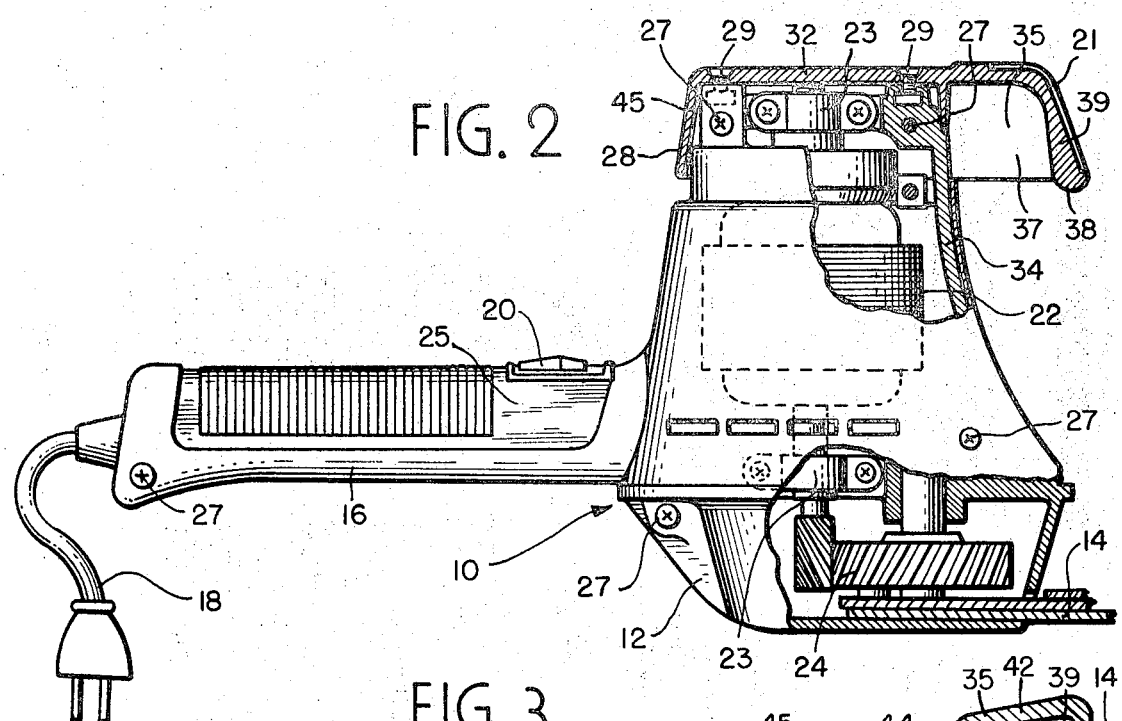
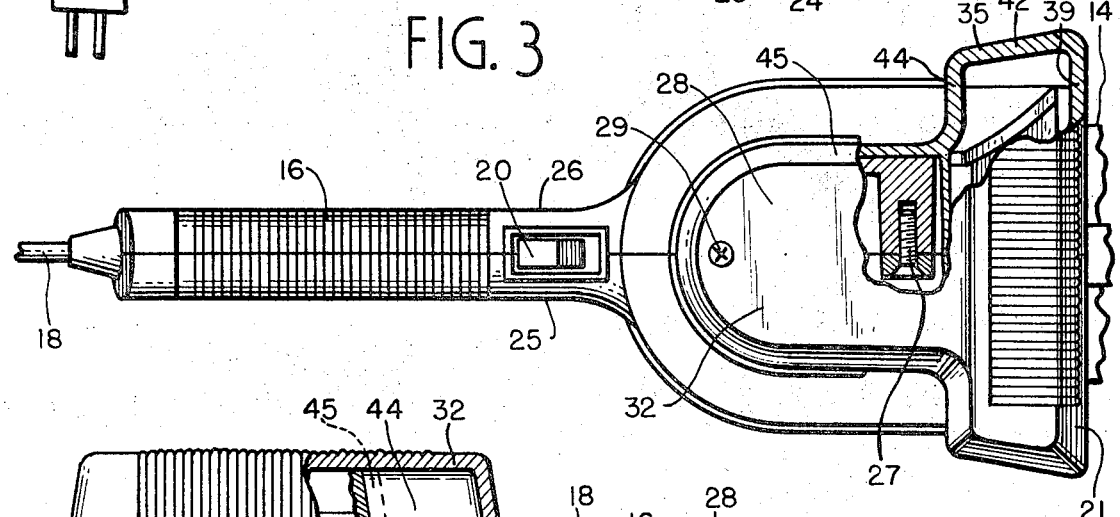
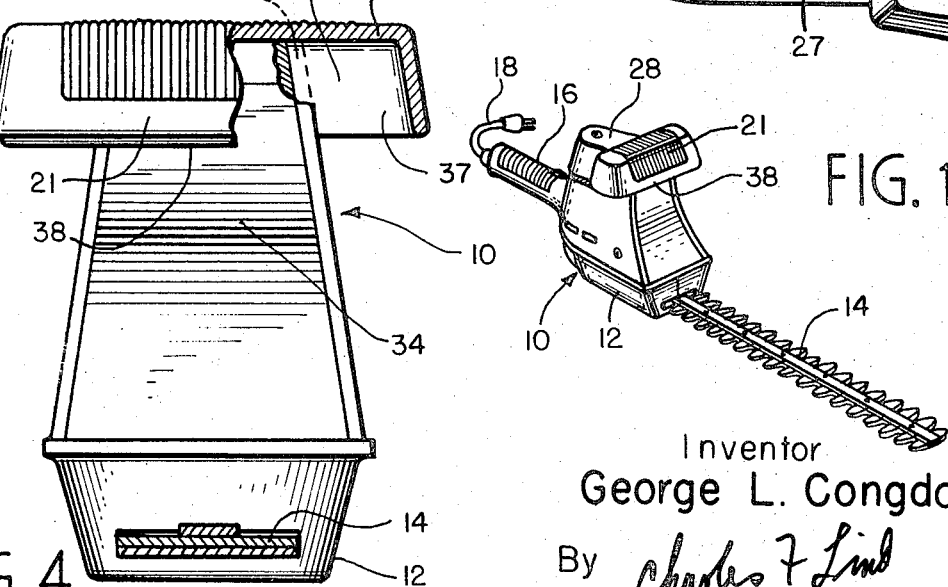
Inventor
George L. Congdon
By Charles F. Lind
Attorney

United States Patent Office 3,564,713
Patented Feb. 23, 1971

---

3,564,713
HEDGE TRIMMER
George L. Congdon, Fort Atkinson, Wis., assignor to McGraw-Edison Company, Elgin, Ill., a corporation of Delaware
Filed Apr. 23, 1969, Ser. No. 818,516
Int. Cl. B26b 19/02
U.S. Cl. 30—208
8 Claims

ABSTRACT OF THE DISCLOSURE

A hedge trimmer having a housing supporting a pair of blades movable in shearing arrangement, where the trimmer housing has integral handle sections formed thereon, one handle section being at the rearward end of the housing and the other handle section being at the upper forward end of the housing and having a top wall and a laterally disposed peripheral wall extended downwardly therefrom terminating spaced above the blades to permit the fingers of the user to grip a forward portion thereof and thumb of the user to be confined against a rearward portion thereof.

---

Electric powered hedge trimmers are used extensively as a gardening tool and typically are light in weight for good portability and have a pair of handles for holding the same. Heretofore, the rear handle has been integral with the trimmer housing and the front handle had been removably secured to the housing, being either an encircling roll bar type handle bolted to the housing or a post type handle threaded into a tap on either side of the housing. Since the post type handle from either side of the housing is not symmetrical of the trimmer, convenient carriage of the trimmer by right and/or left handed persons is not possible without relocating the post to the opposite side of the housing. The roll bar type handle is symmetrical to eliminate this drawback, but this handle is generally quite large and, in fact can hinder the mobility of the trimmer by becoming entangled with the shrubs or hedges to be trimmed. Also, the roll bar type handle adds appreciable weight to the unit, and since the trimmer frequently is supported in a cantilevered fashion, this becomes a potentially serious drawback.

This invention provides an improved handle arrangement for a hedge trimmer wherein both handles for the trimmer are formed integrally of the housing. In particular, there is provided an elongated rear handle and a forward handle having a top wall and a transversely disposed peripheral wall extending downwardly therefrom defining a generally vertical front gripping section spaced above the blades about which fingers of the user may embrace and a rearwardly facing shoulder against which the thumb of the user may be confined, the handles being symmetrical of a vertical plane through the longitudinal center of the unit to permit carriage with equal facility by either a right or left handed user.

Accordingly, an object of the invention is to provide a hedge trimmer having an improved handle arrangement formed as an integral part of the trimmer housing that is also symmetrical of the trimmer.

Another object of the invention is to provide an improved handle arrangement for a hedge trimmer having a rear handle and having a front handle that extends transversely of the housing and that has a top wall and a downwardly directed peripheral wall therefrom terminating spaced above the blades and defining a bottom open cavity and further having a laterally directed rear portion, whereby the fingers of the user wrap around the forward edge of the peripheral wall and extend into the cavity and the thumb of the user is cradled against the rear portion.

These and other objects will be more fully understood after reviewing the following specification, the accompanying drawing forming a part thereof, wherein:

FIG. 1 is a perspective view of the subject hedge trimmer shown in its entirety;

FIG. 2 is a greatly enlarged side elevational view, partly broken away and in section, of the trimmer of FIG. 1;

FIG. 3 is a top plan view, according to the scale of FIG. 2 and partly broken away and in section, of the trimmer of FIG. 1; and FIG. 4 is a front elevational view, according to the scale of FIGS. 2 and 3 and partly broken away and in section, of the trimmer of FIG. 1.

Referring now to the drawing, the trimmer 10 shown in FIG. 1 includes a housing 12 supporting therefrom a pair of blades 14 which have teeth adapted to traverse one another in a shearing fashion. A rear handle 16 is formed integrally of the housing and is elongated in a direction generally parallel to the blades 14. A cord 18 which can be connected to an electric power source (not shown) extends from the handle, and switch 20 on the handle offers convenient on-off control by the user. Another handle 21 is formed on the forward upper portion of the housing spaced above the blades.

Within the housing 12 is located an electric motor 22 having an output shaft journaled in bearings 23 and drive mechanism 24 including a rotating cam element confined in a follower connected to one of the blades 14. Typically, one blade is stationary while the other blade is adapted to oscillate relative to the stationary blade, and the drive mechanism 24 between the motor and the moving blade thus oscillates the blade in the cutting manner previously mentioned. The particular drive mechanism and blade construction form no part of the subject invention and these features can be similar to Pat. No. 3,193,925, which is owned by the same assignee herein.

The housing is formed of complementary casing pieces 25 and 26 meeting generally down the longitudinal vertical center of the housing. The two pieces of the casing are held together by a plurality of bolts 27 fitted through opening in one casing piece and threaded into taps on the other casing piece. A top piece 28 is secured over enlarged motor confining portion of the casing pieces by means of bolts 29 fitted through openings in the top piece and threaded into tabs in the casing pieces. The top and casing pieces are of metal construction such as a zinc die cast or the like.

Referring specifically to FIGS. 2, 3 and 4, top wall 32 is T-shaped and extends beyond the forward housing wall 34, and a peripheral wall 35 extends downwardly from the top wall and defines therewithin a downwardly open cavity 37. The lower edge 38 of the peripheral wall 35 is rounded and spaced well above the blades 14, and the height of the peripheral wall is approximately between ¾" and 1¼" to correspond to the average finger length from the tips to the second joint. Thus the fingers of the user can curl around and grip the forward section 39 of the peripheral wall with the palm of the hand on the top wall 32, the finger tips being received in the open bottom cavity 37. The forward section 39 of the peripheral wall extends at least the width of the average hand, viz between 3" and 5", and preferably is somewhat straight in configuration. The peripheral wall extends rearwardly of the forward section 39 for about 1" as at 42 and then transversely as at 44 to meet with the wall 45. The rear transverse sections 44 of the peripheral wall define with the adjacent walls 45 rearwardly facing notches into which the thumb of an individual can be cradled. Preferably, the breadth of the top wall 32 between the rear transverse section 44 and the forward transverse section 39 is approximately ¾" and 1¼" to correspond to the average inside spread between the thumb and index finger. This permits the thumb to be comfortably confined against the rear transverse section 44 while the fingers are wrapped about and gripping the forward section 39 to firmly anchor the housing within the hand. The top plate is symmetrical of a vertical plane through the longitudinal center of the unit.

Since the handle 21 is integral with the trimmer housing, there is little appreciable weight added to the weight of the unit. Moreover, because the handles 16 and 21 are symmetrically disposed relative to the casing, the trimmer can be equally operated by either a left handed or a right handed individual with no structural modification or adjustment to the unit. The handles are spaced sufficiently from the blades to minimize accidental injury of the user.

What is claimed is:

1. A hedge trimmer having a housing, a motor in the housing, movable blade means supported from the housing on the forward side thereof, drive means between the blade means and motor suitable for oscillating the blade means to effect cutting strokes, a first handle formed as an integral part of the housing and extended from the rearward side thereof in a direction away from the blade means, a second handle formed as an integral part of the housing and located generally at an upper forward portion thereof, and said second handle including a top wall and a peripheral wall extended downwardly therefrom and terminating along a lower edge spaced substantially vertically above the blade means, and the peripheral wall having spaced forward and rearward transverse sections defining therebetween a downwardly open cavity, whereby the user can grasp the second handle with either the right or left hand in a manner that the palm is against the top wall, the fingers grip the forward section of the peripheral wall and extend into the defined cavity, and the thumb is confined against the rearward section of the peripheral wall.

2. A hedge trimmer according to claim 1, wherein the top and peripheral walls are symmetrically disposed of a generally vertical plane extending through the longitudinal center of the housing.

3. A hedge trimmer according to claim 1, wherein the first handle is elongated in the direction of the blade means and extends generally parallel to the blade means.

4. In a hedge trimmer having a housing, movable blade means supported from the housing, and means carried in the housing for oscillating the blade means to effect cutting strokes, the combination of a handle formed generally at an upper portion thereof, said handle including a top wall projected beyond the adjacent housing structure and a peripheral wall extended downwardly approximately between ¾" and 1¼" from the top wall, the lower edge of the peripheral wall being spaced well above the blade means, the peripheral wall having a generally straight section spaced from and substantially parallel to the adjacent housing structure and approximately between 3" and 5" in length and defining a cavity therewithin open toward the blade means, whereby the user can grasp the handle in a manner that the palm is against the top wall and the fingers grip the straight section of the peripheral wall and extend into the defined cavity, and the peripheral wall also having another section spaced from the straight section in the direction toward the adjacent housing structure by approximately between ¾" and 1¼", whereby the thumb of the user can be confined against the other section of the peripheral wall on the side thereof opposite from the straight section.

5. In a hedge trimmer according to claim 4, wherein the handle is disposed directly over and symmetrically of the blade means.

6. In a hedge trimmer according to claim 5, wherein the handle is formed as an integral part of the trimmer housing.

7. In a hedge trimmer according to claim 6, wherein the lower edge of the peripheral wall at the straight section is rounded.

8. In a portable electric tool having a housing, a movable tool means supported from the housing, and motor means carried in the housing and connected to the tool means for operation thereof, the combination of a handle including a first wall spaced from the tool means and projected beyond the adjacent housing structure and a second wall extended from the first wall toward the tool means, the lower edge of the second wall being spaced substantially from the tool means, the second wall having a first section spaced from the adjacent housing structure and defining a cavity therewithin open toward the blade means, whereby the user can grasp the handle in a manner that the palm is against the first wall and the fingers grip the first section of the second wall and extend into the defined cavity, and the second wall also having a second section spaced from the first section in the direction toward the adjacent housing structure, whereby the thumb of the user can be confined against the second section of the second wall on the side thereof opposite from the first section.

References Cited

UNITED STATES PATENTS

| 1,039,021 | 9/1912 | Bullock | 30—216 |
| 3,212,188 | 10/1965 | Riley | 30—216 |
| 3,218,710 | 11/1965 | Bruck | 30—222 |
| 3,431,647 | 3/1969 | Scott | 30—210 |

FOREIGN PATENTS 710,551   6/1954   Great Britain.

LESTER M. SWINGLE, Primary Examiner

J. C. PETERS, Assistant Examiner